(12) United States Patent
Saxena et al.

(10) Patent No.: US 6,311,096 B1
(45) Date of Patent: Oct. 30, 2001

(54) DESIGN OF MICROELECTRONIC PROCESS FLOWS FOR MANUFACTURABILITY AND PERFORMANCE

(75) Inventors: Sharad Saxena; Karthik Vasanth, both of Richardson; Richard G. Burch, McKinney; Purnendu K. Mozumder, Plano; Suraj Rao, Dallas; Joseph C. Davis, Allen, all of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/283,479

(22) Filed: Apr. 1, 1999

(51) Int. Cl.[7] .................................................. G06F 19/00
(52) U.S. Cl. ............................... 700/121; 700/51; 438/14
(58) Field of Search ............................ 700/93, 102, 108, 700/109, 110, 121; 438/14

(56) References Cited

U.S. PATENT DOCUMENTS

| | | | |
|---|---|---|---|
| 5,546,312 | * 8/1996 | Mozumder et al. | 700/97 |
| 5,646,870 | * 7/1997 | Krivokapic et al. | 716/4 |
| 5,781,430 | * 7/1998 | Tsai | 700/28 |
| 5,866,437 | * 2/1999 | Chen et al. | 438/14 |
| 5,956,251 | * 9/1999 | Atkinson et al. | 700/109 |
| 5,966,527 | * 10/1999 | Krivokapic et al. | 703/14 |

* cited by examiner

Primary Examiner—William Grant
Assistant Examiner—Zoila Cabrera
(74) Attorney, Agent, or Firm—Carlton H. Hoel; W. James Brady; Frederick J. Telecky, Jr.

(57) ABSTRACT

A statistical design method is provided for minimizing the impact of manufacturing variations on semiconductor manufacturing by statistical design which seeks to reduce the impact of variability on device behavior. The method is based upon a Markov representation of a process flow which captures the sequential and stochastic nature of semiconductor manufacturing and enables the separation of device and process models, statistical modeling of process modules from observable wafer states and approximations for statistical optimization over large design spaces. The statistical estimation component of this method results in extremely accurate predictions of the variability of transistor performance for all of the fabricated flows. Statistical optimization results in devices that achieve all transistor performance and reliability goals and reduces the variability of key transistor performances.

12 Claims, 1 Drawing Sheet

DESIGN OF MICROELECTRONIC PROCESS FLOWS FOR MANUFACTURABILITY AND PERFORMANCE

BACKGROUND OF THE INVENTION

1. Field of the Invention

This invention relates to a method for improving device design and process flow design in the fabrication of semiconductor devices.

2. Brief Description of the Prior Art

The semiconductor fabrication art is constantly attempting to reduce the cost and cycle time required for semiconductor manufacturing technology development. In this regard, the effect of statistical variations of processing operations during manufacturing on the performance of modern microelectronic devices is becoming an increasingly important issue. Two reasons for the increased significance are, first, that the feature sizes and geometry of deep submicron devices makes device performance very sensitive to small deviations from the desired value and, second, fast time-to-market requires a robust design to minimize parametric yield loss.

The increasing importance of statistical variations makes it necessary to consider manufacturability issues during device and process flow design. The approach taken is modelling and computer analysis to predict the correct or most advantageous process. There are two subapproaches, one being deterministic design, which determines whether the process is feasible at all, and the other being directed toward profitability with improved yield and/or performance being the goal. The present invention is directed to the latter problem, namely profitability.

In the fabrication of semiconductor devices, the fabrication process requires a plurality of processing steps or operations, generally sequential, wherein the result of the same step from device to device will generally vary. To comprehend the impact of these statistical variations during device fabrication on device performance and reliability, a model of the process flow is provided as a sequence of process modules, where each process module is a sequence of contiguous process steps. Each process module transforms the state of the incoming wafer. Mathematically, the state of a wafer can be represented as a vector of all the structure and doping parameters that affect device performance and/or reliability. If $W_k$ is the wafer-state coming into module k, $W_{k+1}$ is the wafer-state after completion of the fabrication step performed in module k, $F_k$ is the wafer-state transformation performed by the module and $P_k$ is the vector of process treatments applied at a module, then, ignoring the effect of manufacturing variations, there results the vector equation: $W_{k+1}=F_k(W_k,P_k)$. Manufacturing variations make the wafer-state a vector of random variables. The equation for wafer state including wafer state transformations changes to: $W_{k+1}=F_k(W_k,P_k)+\epsilon$ [Equation (1)], where $\epsilon$ provides the joint distribution of the random variables comprising $W_{k+1}$. For example, $\epsilon$ could be distributed normally with a mean $\mu$ and covariance matrix $\Sigma$.

One prior art method of reducing the impact of process variations is to employ drive to target process control which is unrelated to the invention herein.

Another approach is to design process flows which are robust to manufacturing variations. This approach is known as statistical design. Most prior work on statistical design has focussed on improving circuit design given a certain level of variability in device performance. The work in this area follows two main approaches, these being design centering and sensitivity minimization. Design centering defines an acceptable region of circuit performance and attempts to find a circuit design that minimizes the probability of falling outside the acceptable region for the given variation in device performance. Typical approaches for design centering are based upon the estimation of the acceptability region and Monte Carlo simulation, which are described in "Optimization of parametric yield: A tutorial", by S. W. Director, P. Feldmann and K. Krishna, *International Journal of High Speed Electronics*, 3(1), pp. 95–136, 1992. A typical approach for sensitivity minimization is to build macromodels like response surfaces of circuit performance in terms of key circuit designables. Sensitivity can then be quickly evaluated and optimized using the macromodels.

Statistical device and flow design has not been as well investigated as statistical circuit design. An approach has been proposed based upon Monte-Carlo process simulation followed by device simulation. This approach makes use of the FABRICS process simulator as discussed in "Algorithms and software tools for IC yield optimization based on fundamental fabrication parameters", by M. A. Styblinski and L. J. Opalski, *IEEE Transactions on Computer-Aided Design*, CAD-5(1), pp. 79–89 (1986) which allows the typical variation in process inputs to be specified along with the process settings for process simulation. Variability in the device performance induced by the variations in process settings can be estimated by performing a device simulation for each final device structure produced by Monte-Carlo process simulation. Non-linear optimization coupled with device performance variability estimation can be used to find process settings that minimize the sensitivity of device performance to variations in process settings.

The prior art has built response surfaces from process settings to the device performance to estimate the effect of process variation on device performance. These response surfaces could be used with Monte-Carlo simulation and estimates of variability in process settings to estimate the variability in device performance.

The difficulty with the above approaches is that variability estimates are required in terms of the process inputs and this estimate is difficult to achieve. It is much easier to estimate the variability in process outputs because they can be measured directly. For example, it is much easier to estimate variability in gate-length, either optically or electrically, than to measure variability in lithography process settings such as exposure dose, mask misalignment, etc. Another disadvantage of modeling device performance in terms of process settings is that coverage of a large number of process inputs requires extremely large numbers of simulations. It is therefore apparent that improved techniques are required.

SUMMARY OF THE INVENTION

In accordance with the present invention, there is provided a method for simultaneously optimizing and trading off manufacturability, performance and reliability criteria during device and process flow design and performing these functions on-line or off-line. The approach is based upon a process flow representation that captures both the sequential and stochastic nature of microelectronics manufacturing. This representation, in conjunction with compact device models for evaluating the device performance from end-of-flow wafer-state, allows use of search and optimization methods to find flows that achieve the device goals.

The design for manufacturability in accordance with the present invention is a general methodology for incorporating manufacturability considerations during process or product design. In semiconductor device fabrication, yield is an important manufacturability concern. Statistical design is an approach for reducing one kind of yield loss, namely parametric yield. Parametric yield loss occurs when functionin, devices do not meet performance or reliability specifications. Parametric yield loss is caused by processing variations during manufacturing.

In accordance with the present invention, there is provided a method for manufacturability optimization that overcomes the above described difficulties inherent in the prior art. As stated, the method is a statistical approach based upon a representation of process flows that capture the sequential and stochastic nature of manufacturing. This representation is a Markov decision process (MDP) (see Dean, T. L. and Welman, M. I., *Planning and Control*, Chapter 6, Morgan Kauffman Press, 1991), the contents of which are incorporated herein by reference. A MDP is a generalization of a much simpler representation called a Markov chain. A Markov chain is a stochastic process with a countable set of states and a transition probability associated with each pair of states. One of the states in the pair is a source state and the other is a destination state. In a Markov chain, the transition probability depends only upon the source and destination states and not on the path that led to the source state.

A Markov chain can represent the effect of process variations introduced in each process module. States are defined by suitably discretizing (i.e., converting an infinite set of real values into a finite set) the set of real values of each component of the wafer-state. The effect of manufacturing variations is represented by transition probabilities between the wafer states. FIG. 1 illustrates this representation. For example, the Module M1 could be a gate oxidation process step in fabricating a MOS transistor and $ws_0$ could be dopant distribution in the channel before gate oxidation. The process variations result in a number of wafer-states with different probabilities. Similarly, Module M2 could be gate electrode etching in fabricating an MOS transistor.

Obtaining a Markov chain representation of a process flow requires three steps:

1. estimating $\in$ in the equation (1) as set forth above for each process module;
2. discretizing the wafer-states to obtain the states of the Markov chain;
3. estimating the transition probabilities of the discretized states.

One advantage of using Equation (1) for statistical modeling is that variability is directly expressed in terms of the output wafer-state of each process module. Since the wafer-state is observable on the wafer, variability estimates can be obtained directly from wafer measurements. Another advantage of using Equation (1) for each module separately rather than the combined modeling of the entire process flow is that modules can be experimentally characterized using short flows. The separation of process flows into modules and the use of compact device models in terms of process-independent device designables allows statistical modeling with less data.

The second key idea of the subject approach is the discretization of the wafer-state. Discretization enables straight-forward approximation for optimization over large design spaces. A hierarchal optimization procedure is followed that starts with coarse discretization of the design space and successively refines the grid in the region optimally identified during the coarse search. Thus, the maximum number of states examined remains roughly the same throughout the optimization.

Transition probabilities are obtained by using Equation (1) above to calculate the probability of the pair $(W_{k+1}, W_k)$ when $P_k$ is the known process condition of the process flow being considered. To handle multiple dimensions, a parameterization has been found for modules in applications such as the wafer-state components impacted by a module are either independent or conditionally independent. FIG. 2 illustrates this calculation for one-dimensional $W_{k+1}$. This allows a probability estimate for each wafer-state component to be multiplied to obtain the probability estimate of a transition.

The Markov Chain representation generates a distribution of end-of-flow wafer-states. By evaluating compact device models at each of the states, the distribution of the desired device performances is obtained. The Markov representation allows the estimation of manufacturability of a given flow. The goal of process optimization for manufacturability is to find the optimal flow from a given set of flows. This is achieved by constructing a Markov chain for each flow and collapsing identical states into a single state. This results in a partially observed Markov decision process (POMDP). The Markov decision process (MDP) is partially observed because the exact state achieved after each process step may not be observable. An extreme case of this situation is where only the initial and final states are considered observable. Manufacturability optimization for this case corresponds to situations where the flow is not modified based on in-line metrology. Whenever in-line metrology exists to estimate the state of a wafer or batch of wafers, for example through the use of in-situ sensors, the uncertainty in states vanishes, and the approach disclosed here can be used to modify the process flow subsequent to the metrology step for manufacturability optimization.

DESCRIPTION OF THE PREFERRED EMBODIMENT

Figure 1:
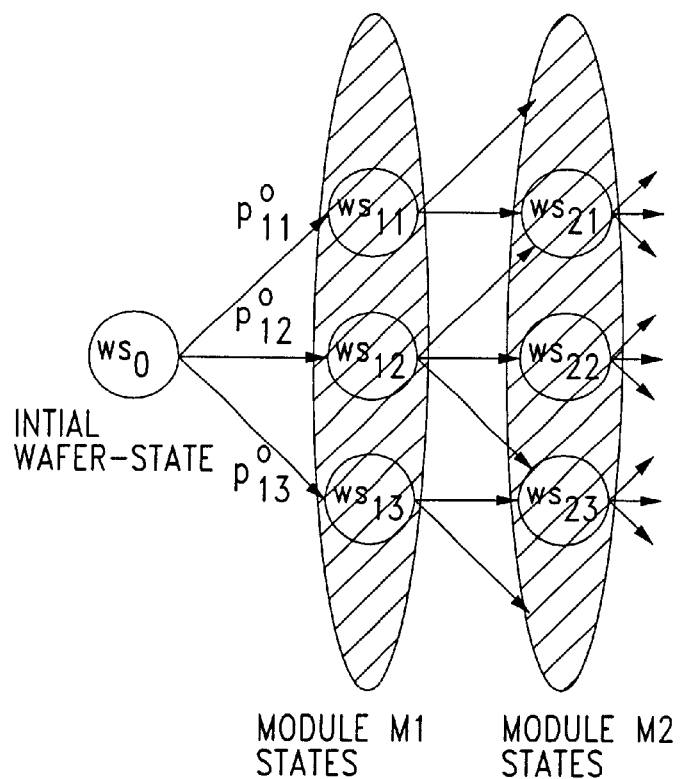
FIG. 1 is a Markov chain representation of a process flow.
Figure 2:
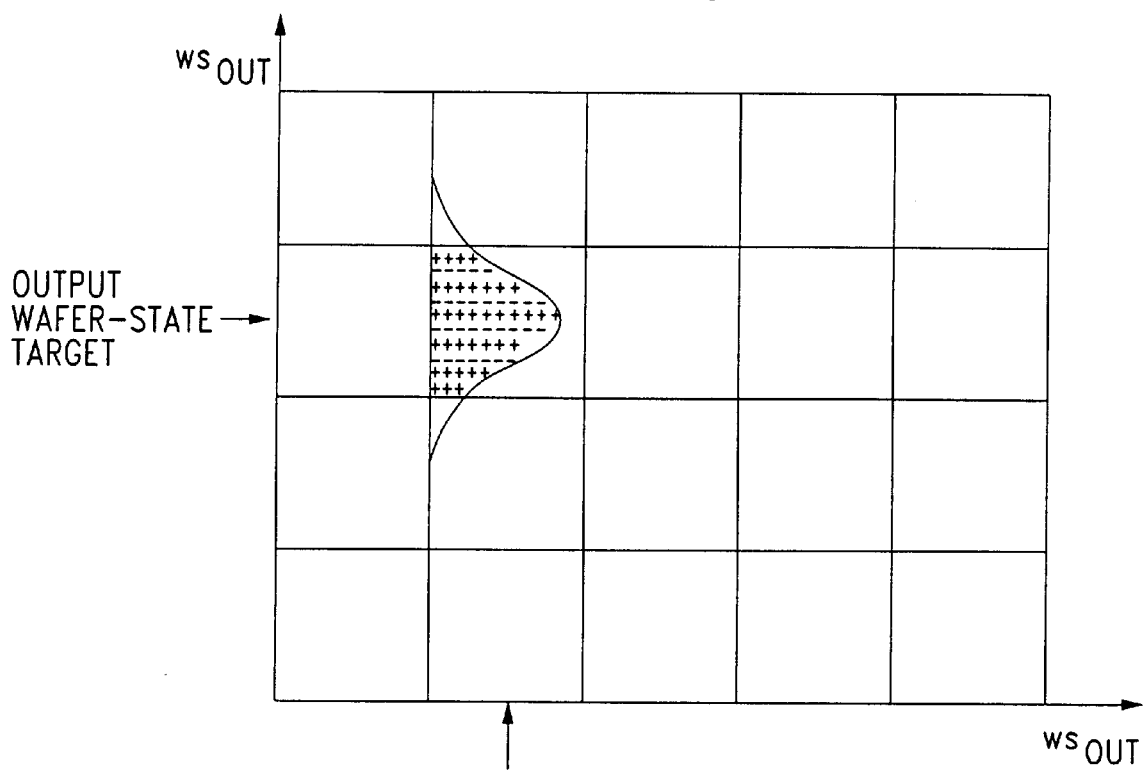
FIG. 2 shows a discretization and probability calculation.

With reference to FIG. 1, there is illustrated a Markov chain representation of a process flow, an example being a portion of a semiconductor process flow. For example, the Module M1 represents channel doping in a CMOS flow and $ws_0$ represents the value of the doping profile parameters in the active regions at the end of the well and the isolation modules. The process variations during ion-implantation result in a number of wafer-states with different probabilities, $p^0{}_{11}, p^0{}_{12}, p^0{}_{13}, \ldots$, the most significant of which are shown as $ws_{11}, ws_{12}, ws_{13}$. Similarly, Module M2 represents the gate module and the process variations during gate-oxidation and gate-patterning result in different wafer-states, the most significant of which are shown as $ws_{21}, ws_{22}, ws_{23}$.

A Markov chain representation of a process flow is obtained by first estimating $\in$ in the equation $W_{k+1} = F_k(W_k, P_k) + \epsilon$ for each process module, where $\epsilon$ provides the joint distribution of the random variables comprising $W_{k+1}$ where, for example, $\epsilon$ could be distributed normally with a mean $\mu$ and covariance matrix $\Sigma$. For each process module, $W_k$ is the wafer-state coming into module k, $W_{k+1}$ is the wafer-state after leaving the module, $F_k$ is the wafer-state transformation performed by the module and $P_k$ is the vector of process treatments applied at a module. The wafer-states are then discretized to obtain the states of the Markov chain and the transition probabilities of the discretized states are estimated. The process flow is then altered to maximize the probability that the device performances of interest fall within a predetermined window.

As a further example, assuming that a channel implant is required, it is known that a given relatively high energy channel implant will have a lesser likelihood of being within a target window as compared with a given relatively low energy channel implant. However, it is possible that the relatively low energy channel implant will require that something be done downstream in the process flow which may not be required or may be required to a lesser extent with the relatively high energy channel implant. Accordingly, the system will determine based upon the entire process flow and preferably on-line how to alter the energy level of the channel implant in conjunction with downstream process steps in order to maximize yield.

The approach described above has been applied to optimize a deep-submicron process flow for manufacturabilty, while meeting performance specifications. In particular, the process flow was optimized to minimize the standard deviation of NMOS drive current (NIdrive) and threshold voltage in saturation (NVtSat), two key measures of NMOS transistor performance.

To perform the optimization, statistical models of the form $W_{k+1}=f(W_k, P_k)+\epsilon$ were constructed for the following process modules:

1) Channel module, consisting of implants in the channel region of a MOS transistor for threshold voltage adjustment and punch through prevention.
2) Gate module, consisting of gate-oxide formation, redistribution of channel dopants and gate electrode formation,
3) Source-Drain module, consisting of formation of source-drain regions and drain extender of a MOS transistor.

The module models were constructed from historical data and short-flow modeling experiments, the statistical model for each module was obtained from analysis of qualification and statistical quality contol (SQC) data routinely collected in a fabrication facility. For example, the distribution of gate oxide thickness was estimatd from gate oxide thickness measured on pilot wafers run for SQC over a long per of time. This distribution provides an estimate of statistical variation at the gate-oxidation process. These module models were used to construct a POMDP representation of the process flows. The POMDP representation was then searched to find the flow that results in the smallest variation in NIdrive or NVtsat.

After fabrication, it was found that, with high statistical significance, the process flow optimized for manufacturability does have a lower standard deviation compared to a flow that optimized only for performance but not for manufacturaility.

Though the invention has been described with reference to a specific preferred embodiment thereof, many variations and modifications will immediately become apparent to those skilled in the art. It is therefore the intention that the appended claims be interpreted as broadly as possible in view of the prior art to include all such variations and modifications.

What is claimed is:

1. A method of improving process flow in fabrication process for fabrication of a device which comprises the steps of:
   (a) providing a model of the process flow as a sequence of process modules which is a sequence of contiguous process steps for providing a device falling within a predetermined window;
   (b) for a first said process module, determining the probability of the state of the device being fabricated being in any one of plural states as a result of a first fabrication process for maximizing the probability of said device being within said window;
   (c) for a second said process model, determining the probablitily of the state of the device being fabricated being in any one of plural states as a result of a second fabrication process and the result of said first fabrication process for maximizing the probability of said device being within said window; and
   (d) altering at least one of said first and second processes in response to results of fabrication of said device to further maximixe the probability that the device performance falls within said window.

2. The method of claim 1 wherein the effect of process variations introduced into each said process module is represented by a Markov chain.

3. The method of claim 1 wherein wherein each said process module transforms the state of the incoming device.

4. The method of claim 1 wherein, the state of a device is represented as a vector of the structure and parameters that affect device performance and/or reliability.

5. The method of claim 2 wherein, the state of a device is represented as a vector of the structure and parameters that affect device performance and/or reliability.

6. The method of claim 3 wherein, the state of a device is represented as a vector of the structure and parameters that affect device performance and/or reliability.

7. The method of claim 1 wherein said process flow is a semiconductor fabrication process flow.

8. The method of claim 2 wherein said process flow is a semiconductor fabrication process flow.

9. The method of claim 3 wherein said process flow is a semiconductor fabrication process flow.

10. The method of claim 4 wherein said process flow is a semiconductor fabrication process flow.

11. The method of claim 5 wherein said process flow is a semiconductor fabrication process flow.

12. The method of claim 6 wherein said process flow is a semiconductor fabrication process flow.

* * * * *